Oct. 8, 1940.  F. LAUCK  2,217,255
GYROSCOPE
Filed April 20, 1938
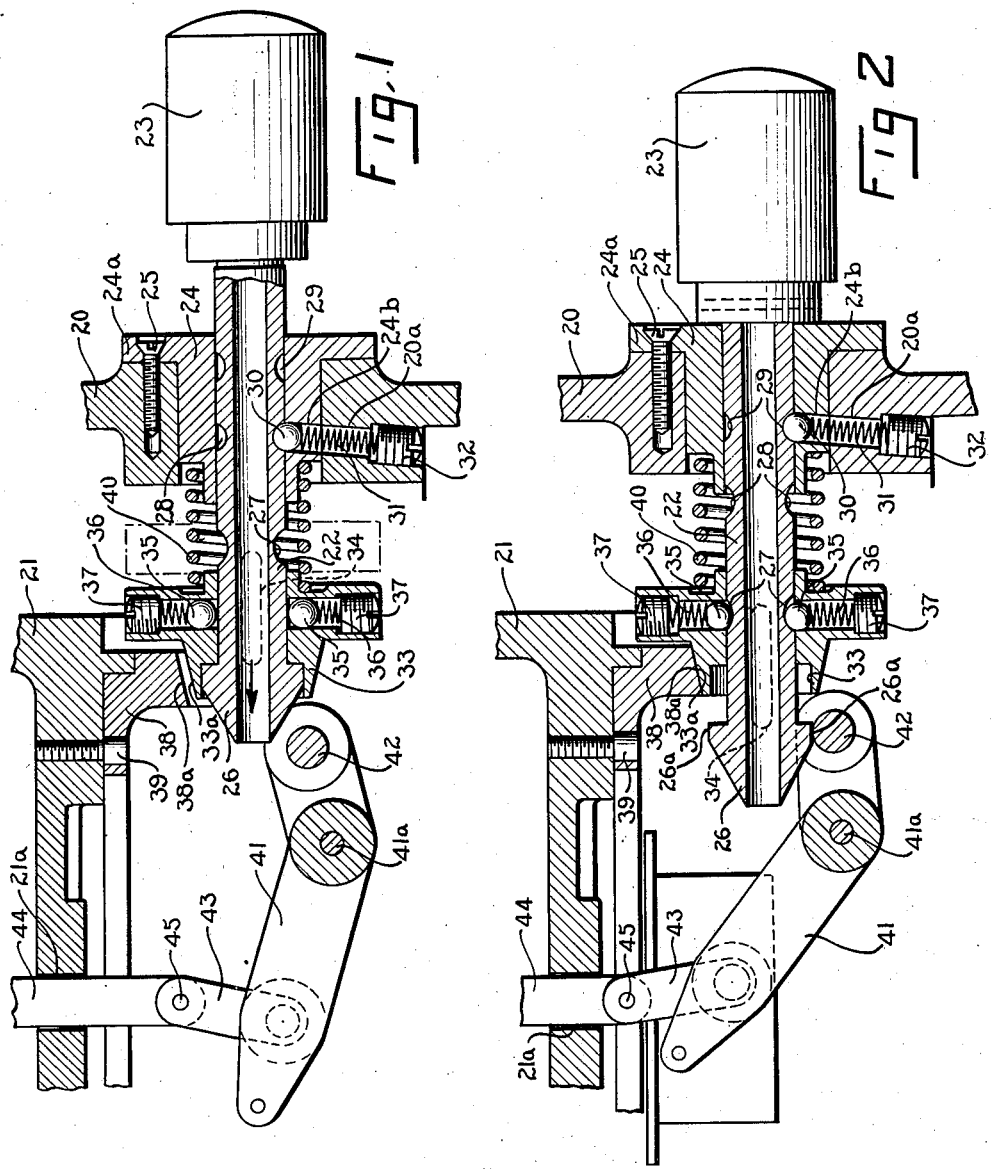
INVENTOR.
Friedrich Lauck
BY Stephen Cerstvik
ATTORNEY.

Patented Oct. 8, 1940

2,217,255

UNITED STATES PATENT OFFICE 2,217,255

GYROSCOPE

Friedrich Lauck, Berlin-Spandau, Germany, assignor to Siemens Apparate und Maschinen Gesellschaft mit beschränkter Haftung, Berlin, Germany, a corporation of Germany Application April 20, 1938, Serial No. 203,155
In Germany January 3, 1936

9 Claims. (Cl. 74—5)

This invention relates to gyroscopes, and particularly to apparatus for adjusting the position of the axes of gyroscopes.

It is often necessary to clamp in a fixed position the mounting of a directional gyroscope, for example, an automatic gyro-pilot for aircraft, in order to prevent tumbling of the gyroscope when sudden changes in attitude are made. It is also often necessary to clamp the gyroscope mounting in order to readjust the position of the gyroscopic axis of rotation and thus the direction indicating pointer of the apparatus. This readjustment is usually accomplished by a manually operated knob which by means of a clutch is connected with the Cardan ring mounting and adapted for moving the ring in azimuth. This azimuth adjustment must be made when the axis of rotation is level; otherwise, a disturbing precessional movement will be produced. If this axis is not level, it must be made so by a suitable leveling device. However, when leveling the axis of rotation, a disturbing precessional moment is produced tending to turn the Cardan ring in azimuth. Consequently, before the leveling can safely take place, the Cardan ring must be clamped in a fixed position by said clutch. If the clamping of the Cardan ring occurs even a short time after the leveling of the axis of rotation, the mechanism may be subjected to violent precession in azimuth which if communicated, for example, to a gyroscope controlled automatic pilot, would make excessive load demands upon the device and cause large course deviations and dangerous flight conditions.

One of the objects of the present invention is to provide novel means for clamping the mounting of a gyroscope and for actuating leveling means for the axis of rotation wherein disturbing precessional moments are avoided.

Another object is to provide novel means for engaging the mounting of a gyroscope and for actuating a leveling device for the axis of rotation, which means are compact and employ a small number of parts.

A further object is to provide novel means for preventing a directional gyroscope from tumbling when sudden changes in attitude are made by the craft upon which it is mounted.

An additional object is to provide novel means for readjusting the position of a gyroscopic axis of rotation.

Another object is to provide novel means of the character described wherein the use of toothed gears is eliminated, thus permitting engagement of the azimuth adjusting means without the possibility of gear teeth colliding when brought into mesh.

The above and further objects and advantages will appear more fully hereafter in the detailed description which is to be read with the accompanying drawing. It is to be expressly understood, however, that the drawing is for the purpose of illustration only and is not intended to define the limits of the invention, reference being had for this latter purpose to the appended claims.

In the drawing, wherein like reference characters refer to like parts throughout the several views, Fig. 1 is a side elevation, partly in section, of one embodiment of the invention showing the clamping means in the disengaged position; and, Fig. 2 is a view of the embodiment shown in Fig. 1 in the engaged position.

The form of the invention illustrated in the accompanying drawing, by way of example, is a device for enabling the adjustment of the angular position of the axis of rotation of a directional gyroscope by means of a clutch and an axis leveling device (not shown). A clutch member, which is slidably mounted upon a longitudinally displaceable plunger and adapted for rotation therewith, engages the mounting of the gyroscope and prevents the same from rotating in azimuth under the influence of precessional moments which are produced when it is necessary to level or to thrust the axis of rotation into the horizontal. The clutch member is yieldingly held against a suitable limit stop upon the plunger at such a point that, when the plunger is thrust inwardly, the clutch engages the Cardan ring before the leveling device is actuated. The latter device is actuated by said plunger which engages, at the end of its stroke, suitable lever means operatively connected to the leveling device. Means are provided for simultaneously disengaging the clutch from the Cardan ring and the plunger from said lever.

In the form illustrated in Fig. 1, novel means are provided for angularly adjusting the position of the axis of rotation of a gyroscope (not shown) which is mounted in Cardan ring suspension and provided with an axis leveling device (not shown), the suspension and leveling device being similar to that shown in copending application of Heinrich Roland, Serial No. 185,758, filed January 19, 1938. A portion of said suspension comprising a part of frame 20 and a part of Cardan ring 21 is shown in Fig. 1. The novel adjusting means is constituted by a clutching arrangement for engaging and holding the Cardan ring 21 and means for actuating the leveling device. The clutch arrangement is also adapted for moving said ring in azimuth and is operatively connected to a longitudinally displaceable hollow plunger 22 provided at one extremity with a hand knob 23. The plunger is mounted in a tubular bearing portion 24 which extends through a bore in the frame 20 and is firmly held in position by suitable bolts 25 which engage an annular lip 24a of said bearing. At the opposite extremity of the plunger is a conical head portion 26 having a cylindrical base 26a which is adapted for engaging and moving a lever arrangement, the purpose of said lever arrangement and cylindrical base to appear later. Plunger 22 is provided in the embodiment shown with three annular grooves 27, 28, and 29. The purpose of the first groove which is wider than the others will appear later. Grooves 28 and 29, however, cooperate with a detent to hold plunger 22 in the inoperative and operative positions, respectively. The detent is constituted by a ball 30 resiliently urged against the plunger by a spring 31. Said ball and spring are held in registering bores 20a and 24b in members 20 and 24, respectively, by means of a retaining screw 32.

The above-mentioned clutching arrangement is constituted by a clutch member 33 having a clutch face 33a, said member 33 being provided with a central bore through which plunger 22 extends. By means of a key 34 which engages registering keyways in said plunger and clutch member, the latter is adapted for longitudinal displacement upon the plunger and for rotation therewith.

In order that clutch member 33 may engage groove 27 of plunger 22 at a predetermined point and be caused to move in longitudinal displacement therewith, for a purpose to appear later, spring loaded detent balls 35, 35 are provided in the clutch member in diametrically opposed bores. Coil springs 36, 36 retained in said bores by screws 37, 37 yieldingly urge the balls against plunger 22.

Clutch face 33a is adapted for engaging a clutch crown 38 having a face 38a. Clutch crown 38 is in the form of an annular ring and is rigidly attached to the lower face of Cardan ring 21 by suitable stud bolts 39. Clutch crown 38 should be of different material than clutch member 33; for example, the former may be of some compressed fibrous material and the latter of metal or vice versa.

In order that clutch member 33 may positively engage crown 38, the former is yieldingly urged toward the head 26 by means of a coil spring 40, upon the plunger 22, interposed between said clutch member and the tubular bearing 24. Coil spring 40 also serves the purpose of causing the pressure of clutch face 33a upon crown face 38a to be independent of the pressure exerted by hand upon the plunger. When the clutch member 33 is in contact with the head 26 which is integral with the plunger, said coil spring communicates its pressure to the plunger urging the same to the left. The plunger is retained, in the withdrawn position, against the pressure of spring 40 by means of detent 30 which engages groove 28 as in Fig. 1.

Means are provided for actuating the mechanism for leveling the axes of rotation comprising, in the form shown, a rocker arm 41 pivotally mounted upon frame member 20 at 41a such that a lug 42 upon one extremity of the rocker arm is engaged by the conical head 26 when plunger 22 is thrust inwardly whereby the arm is pivotally moved about 41a in a clockwise direction. Rocker arm 41 is operatively connected, at the oposite extremity thereof, to the leveling device, for example, by means of a rod 43 which is pivotally connected to a rod 44 at joint 45. Rod 44, in turn, is longitudinally displaceable in a central bore 21a in the lower portion of Cardan ring 21 and communicates its reciprocating motion to said leveling device to actuate the same.

In operation, the plunger 22 is thrust inwardly by means of knob 23 from the position shown in Fig. 1. The pressure of spring loaded detent 30 in groove 28 will be overcome and, in cooperation with the pressure of spring 40, the plunger will be shifted. As the longitudinal displacement progresses, first clutch member 33 will engage clutch crown 38 and will clamp Cardan ring 21 in a fixed position, provided knob 23 is not rotated. Plunger 22 will continue to move until conical head 26 engages lug 42 of rocker arm 41 which will be angularly displaced in a clockwise direction. This displacement will be communicated to the leveling mechanism by linkage 43, 44. A counteracting pressure caused by the leveling device, acting through the above linkage, will tend to thrust plunger 22 outwardly when lug 42 is engaging the cone 26. However, when said plunger is at the inner position, the lug 42 rides upon cylindrical base portion 26 (Fig. 2), thus eliminating said outward thrust. Plunger 22 is yieldingly retained in the inner position by detent 30 which engages groove 29. Simultaneous with the engagement of groove 29 by detent 30, the detents 35, 35 move into groove 27. Groove 27 is sufficiently wide to permit the clutch member to move longitudinally a small amount when the detents are in the groove. This permits a small amount of free motion which will insure that the pressure of spring 40 is communicated to the clutch and is not overcome by the detents 35, 35. In the position shown in Fig. 2, a rotation of knob 23 will be transmitted to Cardan ring 21 by clutch 33, 38 and the position of the directional axis of the apparatus, i. e., the axis of rotation may be adjusted in azimuth.

When the plunger is withdrawn from the position shown in Fig. 2, the clutch member 33 moves longitudinally therewith for a predetermined distance due to the fact that the spring 40 is overcome by detents 35, 35 cooperating with the plunger and clutch 33. Consequently, the clutch 33, 38 and the rocker arm 41 are released simultaneously, thus freeing both the axis of rotation and the Cardan ring simultaneously. This release avoids the precession which might occur, if the clutch and rocker arm were disengaged in succession. As plunger 22 is further withdrawn, the spring 40 is compressed until the longitudinal pressure exerted by spring 40, upon clutch member 33, is sufficient to force detents 35, 35 out of groove 27 and to move said member toward plunger head 26 and clutch crown 38. By this time, head 26 has moved longitudinally to a point where it will prevent the clutch member from reengaging the clutch crown.

There is thus provided a novel device for adjusting the position of the directional axis of a gyroscope. It is so constructed that tumbling or wandering of the gyroscope is prevented while the adjustment is being made. The use of toothed gears is eliminated, thus permitting engagement of the azimuth adjusting means without the possibility of gear teeth colliding when brought into mesh. The device is positive in operation and ruggedly constructed with a minimum number of working parts.

Although only one embodiment of the invention has been illustrated and described in detail, it is to be expressly understood that the invention is not limited thereto. For example, in the form shown, instead of the small conical clutch 33 engaging the axially perpendicular clutch crown 38, the former may be concentric with and equal in size to the latter. Instead of employing a cone clutch, any suitable clutch means may be employed. Various changes may also be made in the design and arrangement of the parts illustrated without departing from the spirit and scope of the invention, as the same will now be understood by those skilled in the art. For a definition of the limits of the invention, reference will be had primarily to the appended claims.

What I claim is:

1. In apparatus of the class described, a plunger having a conical head mounted for reciprocal movement, a clutch member slidably mounted upon said plunger, a clutch face mounted in the path of movement of said clutch member for engagement therewith, resilient means for urging said clutch towards said head, a lever pivotally mounted adjacent said head in one position thereof and adapted for sliding engagement therewith after the engagement of said clutch face and member, yieldably urged detents mounted adjacent to and spaced longitudinally of the plunger, means on said plunger cooperating with said detents for retaining said plunger at the limits of movement thereof, a yielding detent upon said clutch member and means on said plunger cooperating with said detents when said clutch is in engagement with said face.

2. In apparatus of the class described, a plunger mounted for reciprocating movement, a lever in the path of movement of said plunger, a beveled clutch member slidably mounted upon said plunger, a bevelled clutch crown in the path of movement of said member, said plunger having means adapted for slidingly engaging said lever after the engagement of said clutch member and crown, resiliently pressed means for retaining said plunger at the limits of the reciprocating movement thereof, a second resilient means for urging said clutch member toward said crown, stop means on said plunger limiting the movement of said clutch member by said second resilient means, a yieldably urged detent upon said clutch member, and means on said plunger cooperating with said detent and operable after the actuation of said lever by said plunger, said detent being adapted to remain in engagement with said plunger until overcome by said second-named resilient means.

3. In apparatus of the class described, a longitudinally displaceable plunger, a bevelled clutch member mounted upon said plunger for movement with respect thereto, a bevelled clutch crown adapted for engagement with said member, a lever in the path of movement of said plunger, said plunger having means slidingly engaging said lever after the engagement of said clutch member and said crown, means operable when said plunger engages said lever for interlocking said clutch member and said plunger, and means for rendering said last-named means ineffective at a predetermined point in the displacement of said plunger.

4. In apparatus of the class described, a longitudinally displaceable plunger, resilient means cooperating with means on said plunger for holding said plunger at the extremities of the operating range thereof, a clutch member operatively connected to and being mounted for yielding movement on said plunger, a rotatable member in the path of movement of said clutch member, means on said clutch member cooperating with means on said rotatable member for frictionally holding the same when said clutch member is moved into contact with said rotatable member, a lever in the path of movement of said plunger, said plunger being adapted to engage said lever after the frictional engagement of said rotating member by said clutch member, means for interlocking said clutch member and plunger when both the lever and the rotatable member are engaged, and means for disengaging said last-named means operable at a predetermined point in the operating range of said plunger.

5. In a gyroscopic apparatus having a rotatable ring element, the combination with said apparatus of means for frictionally engaging said ring element comprising a clutch member mounted adjacent said ring, a plunger mounted for reciprocating movement, means slidably mounting said clutch member upon said plunger, means yieldingly urging said member toward one extremity of said plunger, means locking said member to said plunger for rotation therewith, means comprising a pivoted lever being mounted in the path of movement of said plunger and means on said plunger engaging said lever after said clutch member engages said ring element, means for resiliently retaining the plunger at the extremes of the reciprocating movement thereof, and means interlocking said clutch and plunger after said lever has been actuated, said means being disengageable at a predetermined axial displacement.

6. In a direction indicating system of the class having a rotatable ring element, the combination with said system of a plunger, means mounting said plunger for reciprocating movement, a clutch member, means mounting said member for sliding movement with respect to said plunger, means locking said member to said plunger for rotation therewith, means for resiliently holding said clutch at a predetermined position on said plunger, means on said clutch member cooperating with means on said ring for frictionally holding said ring in one position of said member, a lever located in the path of movement of said plunger, means on said plunger slidingly contacting said lever for actuating said lever after the frictional engagement of said clutch and ring, and means for simultaneously disengaging said ring and lever from said clutch member and plunger.

7. In a directional indicating system of the class having a rotatable ring element, the combination with said system of means for frictionally engaging said ring comprising a plunger having an annular groove, means mounting said plunger for reciprocating movement, a clutch supported by said plunger, a portion of said clutch being axially displaceable upon said plunger into contact with said ring, means comprising a lever disposed in the path of movement of said plunger, means on said plunger slidingly engaging said lever after the engagement of said clutch, and a detent upon said clutch portion adapted for engaging said annular groove whereby said clutch portion is axially displaceable with said plunger at a predetermined point in the reciprocation of said plunger.

8. In gyroscopic apparatus having a rotatable ring element and means adapted for longitudinal displacement with respect to said ring element, the combination with said first-named means of a plunger having a head portion, a clutch member, means mounting said plunger for reciprocating movement, means mounting said clutch member for movement axially of said plunger, yielding means for urging said clutch member against said head and into contact with said ring, means on said clutch frictionally engaging said ring, a rocker arm operatively connected to said first-named means, and means on said plunger head slidingly engaging said arm at one position of said plunger.

9. In gyroscopic apparatus having a rotatable ring element and means adapted for longitudinal displacement with respect to said ring element, the combination with said apparatus of a plunger having an annular groove, means mounting said plunger for reciprocating movement, a clutch member mounted for movement axially of said plunger into contact with said ring, yielding means for retaining said clutch member at an extremity of said plunger, and a lever operatively connected to said first-named means located in the path of movement of said plunger, means on said plunger slidingly engaging said lever after the engagement of said clutch member and ring, and a detent on said member, said detent being adapted for engagement with said groove after the actuation of said lever, said groove being wider than said detent thereby permitting limited reciprocation of said clutch member after the engagement of said detent and groove.

FRIEDRICH LAUCK.